(12) United States Patent
Zoske et al.

(10) Patent No.: US 6,701,856 B1
(45) Date of Patent: Mar. 9, 2004

(54) FARMING APPLICATOR

(75) Inventors: Mick Zoske, Iowa Falls, IA (US); Richard D. Winter, Hubbard, IA (US)

(73) Assignee: Winske, Inc., Iowa Falls, IA (US)

( * ) Notice: Subject to any disclaimer, the term of this patent is extended or adjusted under 35 U.S.C. 154(b) by 0 days.

(21) Appl. No.: 09/962,973

(22) Filed: Sep. 24, 2001

(51) Int. Cl.[7] ............................................. A01C 23/00
(52) U.S. Cl. ..................... 111/121; 111/140; 172/158
(58) Field of Search ........................ 111/118, 119, 120, 111/121, 122, 129, 140, 164, 191, 192, 193; 172/701, 579, 158, 145

(56) References Cited

U.S. PATENT DOCUMENTS

| | | | | |
|---|---|---|---|---|
| 3,945,332 A | * | 3/1976 | Wirsbinski | 111/120 |
| 4,426,940 A | * | 1/1984 | Brain et al. | 111/123 |
| 4,987,841 A | | 1/1991 | Rawson et al. | 111/121 |
| 5,370,068 A | | 12/1994 | Rawson et al. | 111/121 |
| 5,477,792 A | * | 12/1995 | Bassett et al. | 111/121 |
| 5,520,125 A | | 5/1996 | Thompson et al. | 111/120 |
| 5,542,362 A | * | 8/1996 | Bassett | 111/120 |
| 5,682,829 A | * | 11/1997 | Sukup | 111/121 |
| 5,752,453 A | * | 5/1998 | Nikkel et al. | 111/121 |
| 5,865,131 A | | 2/1999 | Dietrich, Sr. et al. | 111/121 |
| 6,067,918 A | * | 5/2000 | Kirby | 111/118 |
| 6,138,590 A | | 10/2000 | Colburn, Jr. | 111/118 |
| 6,289,829 B1 | * | 9/2001 | Fish et al. | 111/121 |

* cited by examiner

Primary Examiner—Victor Batson
(74) Attorney, Agent, or Firm—Mark A. Litman & Assoc P.A.

(57) ABSTRACT

A device is attached to a vehicle, such as a tractor, to deliver slurry into soil. The device has a hinged connector allows side-to-side movement between the vehicle and the main frame. There is at least one coulter attached to the main frame, a retaining wheel and slurry applicator attached to the main frame; and a closure wheel attached to the main frame. The at least one coulter preferably is a double coulter system.

11 Claims, 6 Drawing Sheets

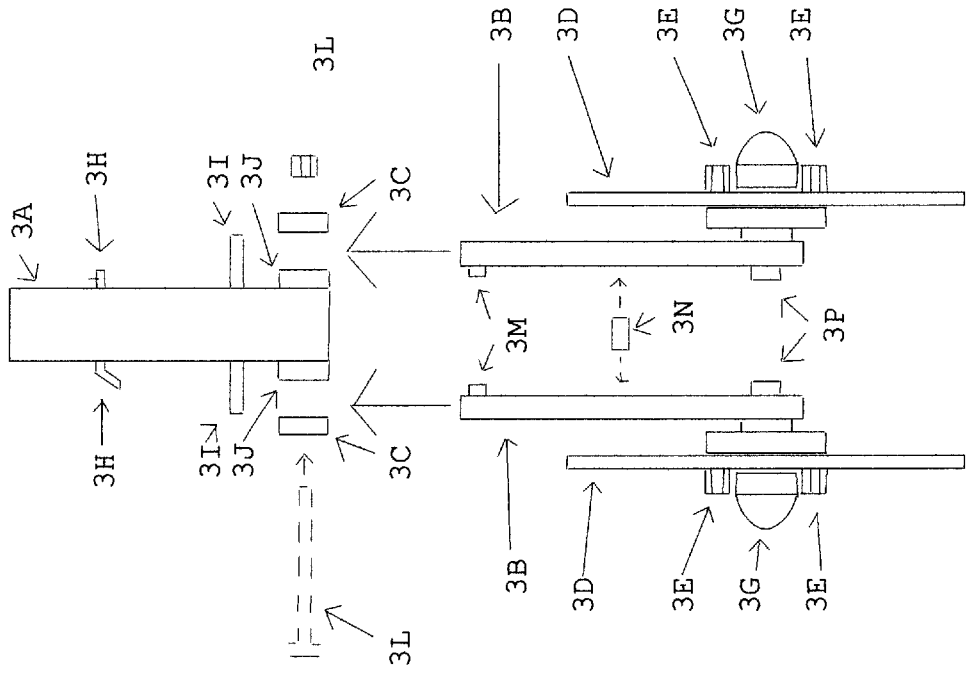
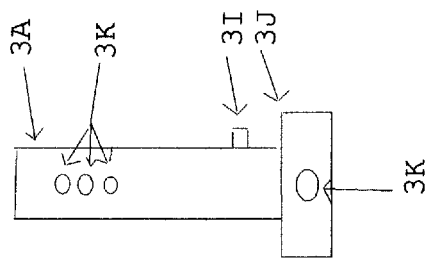

FARMING APPLICATOR

BACKGROUND OF THE INVENTION

1. Field of the Invention

The present invention relates to agricultural fertilizer applicators; and more particularly, it relates to apparatus for subsoil application of livestock waste in the form of a slurry (that is, a freely flowable mixture of liquids and solids).

2. Background of the Art

Historically, livestock waste, particularly in solid form, has been spread on the surface of the soil by a manure spreader using a flail to fling the material to the rear. A more modem side-discharge spreader also discharges the material on the surface of the soil. The advent of confinement systems for animals which include pits below the confinement area, produces a large amount of animal waste which must be handled and disposed of in a slurry form. Typically, the slurry is pumped into a large tank carried by a wagon, but it is still, for the most part, spread or sprayed on the surface of the soil.

This procedure has, as a principle objection, a strong odor which resides after the waste is spread. More-over, surface-spreading of animal waste creates a hazard with the potential runoff of nitrates into rivers and streams or seeping of the material into ground water. This is objectionable because livestock waste is high in nitrogen, and with increasing concern with the quality of drinking water, this procedure is becoming less and less acceptable.

Various methods have been proposed for depositing the slurry underground. One method is to use a fertilizer knife, such as shown in U.S. Pat. No. 4,592,294, and to weld a large pipe to the rear of the knife to deliver the slurry behind the knife and into the slot cut in the soil by the knife. This leaves a very narrow band of fertilizer having a high concentration of nitrogen.

Another method of subsoil delivery of animal waste employs a standard chisel plow shank with an attached wide cultivator sweep, in an attempt to distribute the slurry further laterally and to avoid the concentration which occurs in the case of a simple fertilizer knife, described above.

This method, however, has not fully overcome the concentration problem, and it presents still another problem-namely, the cultivator sweep unnecessarily tills the soil and may result in burying surface residue. This may be a separate problem, particularly for farmers whose land may have been designated HEL, because there are federal requirements to maintain a certain percentage of crop residue on the surface soil. Both the chisel plow shank (which is a wide shank) and cultivator sweeps are designed to create a plowing action that mixes the soil with the residue, buries a large percentage of the residue, and leaves a furrow behind the shank.

U.S. Pat. No. 5,865,131 shows an agricultural slurry applicator having a frame, the is combination comprising: a coulter mounted to said frame to part the soil and form a slot; a shank assembly adapted to be mounted to said frame behind said coulter and comprising: a shank for forming a slot in the soil behind said coulter; a shin wedge mounted in front of said shank and having a vertical leading edge following in the slot formed by said coulter to widen said slot to a width approximately equal to the width of said shank; a point mounted to the bottom of said shank and extending forwardly thereof; first and second wings mounted behind said point and respectively on either side of said shank each wing having a cutting edge extending outwardly and rearwardly relative to said point, said point and wings cooperating to break the soil in front of said shank and to lift the soil along paths defined by said wings to form fissures without substantial tillage of the soil; and a slurry delivery tube mounted to said shank and extending downwardly in the slot formed by said shank, said delivery tube defining a discharge opening to place slurry immediately behind said shank and adjacent the inboard ends of said fissures formed by said wings, whereby said slurry moves outwardly in said fissures as they are formed by said wings and the soil raised by said wings is free to fall after said wings have passed and said slurry has been placed. The advantage of that construction is the employment of a spring-cushioned coulter running ahead of the applicator for cutting an initial slot in any residue and for providing a break line for the soil to be parted by the trailing shank. The trailing shank, in turn, spreads the initial slot, and deepens it, for the entry of a slurry delivery tube welded behind the shank.

The trend toward reduced-till and no-till farming for soil and water conservation is shown graphically in an article published in the New York Times May 11, 1982, entitled "Erosion Wary Farmers Are Sparing Traditional Plow". The necessity for sub-surface application of fertilizers for efficient utilization of plant food, as indicated by research done by TVA's NFDC, universities, and agriculture experiment stations, has resulted in many proposals for solving this problem. Some of these are outlined in the article entitled "Making Fertilizer More Efficient" in the periodical "Big Farmer", April 1982 edition.

TVA scientists have stated that broadcast application of nitrogen fertilizers on no-till soils can result in losses as high as 40 percent, and the author of the "Big Farmer" article states "Efficiency standards for broadcasting phosphorous range from 10 to 30 percent." There is little no doubt that even the most "backward" farmer is aware of the tremendous increase in cost of fertilizers, and the necessity for its efficient placement, which is bound to result in the adoption of sub-surface application.

Most methods of sub-surface placement in reduced-till or no-till farming involve the use of a cutting coulter running ahead of a knife or chisel plow with a liquid fertilizer application tube extending down the back of the knife or plow. Theoretically this may seem to be a good method, but the development of numerous such applicators since 1952 has proved that this method is not practical for general use. In hard ground it is practically impossible to apply enough force on coulters to keep them in the ground, and even if this can be done (by using only a minimum number) their life is very short because they are subject to bending, breakage and bearing and spindle failures. In soft ground coulters may not cut the trash, but push it below the surface where it will be caught by the applicator blade or chisel plow and tear out wide trenches in the soil. Further, unless the coulter is kept in exact alignment with the applicator blade, trash will wedge between the coulter and the blade, and tear out large chunks of soil. It is practically impossible in normal usage to keep the coulter and knife aligned for any length of time, because driver-operators will nearly always turn the machine to some degree with the tools in the ground.

Jet injection of agricultural liquids into the soil in no-till farming, i.e. without appreciable disturbance of the soil, has been proposed. Among the earliest of these proposals is that disclosed is U.S. Pat. No. Re 25,307, Dec. 25, 1962, which had as its principal object the continuous injection of anhydrous ammonia, at the bottom of a slot cut by a coulter, with a high pressure (e.g., 2000 psi) traveling jet having a velocity of the order of at least 700 feet per second and a fineness of the order of about 0.007 to about 0.050 inch in diameter. Another proposal is that disclosed in Baldwin et al., U.S. Pat. No. 3,012,526, which had as its principal object the successive injection of slugs of agricultural liquids with a high pressure (e.g. 500–1500 psi) traveling intermittent jet having a fineness of 0.080 inch in diameter. For this purpose Baldwin used a high pressure reciprocating pump and a spring-closed valve in the injection nozzle set to open at a predetermined pressure to receive liquid from the pump and create the successive high velocity slugs at the jet nozzle.

Such proposals, however, have not become commercial because of their lack of efficiency in terms of liquid placement or equipment cost and life. The sub-surface placement of a continuous band of liquid along a plant row is impractical because at normal application rates, i.e., gallons per acre, the jet must be so fine that extremely high pressures must be used to achieve sufficient penetrating power. Further, the necessary extremely small nozzle orifice would clog up constantly. Intermittent injection of liquid along a plant row has its advantages over continuous injection in that nozzle size may be increased and the jet accordingly can achieve the same penetrating power as a continuous fine jet with reduced pressure. A larger nozzle also is not so susceptible to clogging.

U.S. Pat. No. 4,624,193 is asserted to provide an improved method and apparatus for high pressure injection of agricultural liquids into the soil without the necessity of any tillage, i.e., disturbance of the soil by mechanical means, which is efficient and economical from the standpoint of both placement of adequate quantities of liquid at the proper subsurface location and cost, life and ease of operation of the apparatus. The foregoing object is attained by the use of a series of jet nozzles, one for each plant row, spaced along the usual tool bar, creating by an appropriate pump a source of liquid under substantially constant high pressure with an adjustable delivery rate proportional to ground speed; and connecting that source successively to the nozzles at a timed rate proportional to ground speed so that the entire output of the pump is concentrated through one nozzle at a time, for a brief interval, e.g., a fraction of a second, to eject a high velocity slug of liquid that will penetrate the soil to an agrinomically satisfactory depth, e.g. 2–6 inches. The timing is such that one slug is injected from each nozzle during a predetermined distance of travel thereof, e.g. 12", to provide a series of equally spaced injections along each plant row. That invention is accomplished by the use of a timing distributor that concentrates the entire output of an adjustable-delivery-rate high pressure pump through relatively large jet nozzles, one at a time, for only a fraction of a second. This provides the greatest possible jet penetrating power for a given maximum pressure. A continuously flowing small jet nozzle would require 4 to 5 times the pressure for the same jet penetrating power, and the nozzle would have to be so small that it would clog up continuously.

Krumholz U.S. Pat. No. 3,701,327, entitled "PLANTER AND METHOD OF PREPARING SOIL", discloses a fertilizer and planter assembly having a single forward-mounted fluted coulter for cultivation and residue removal. The Krunholz patent also includes the coulter and fertilizer elements as parts of a central frame apparatus. The Krumholz patent does not disclose any specific mounting or biasing assembly for the coulter unit in relation to the main frame assembly, nor the use of a dual coulter assembly for increased soil preparation efficiency.

Hardin et al. U.S. Pat. No. 4,187,916, entitled "SOIL CONDITIONING AND SEED BED PREPARING APPARATUS", discloses a main frame assembly having a subsoil trenching blade with following fertilizer delivery tube and a trench filling fluted coulter wheel. Mounted to the front of the main frame by unequal length control arms is a fluted coulter with exposed spring biasing means. On the rear of the main frame is mounted a flex arm on each side of which is mounted a fluted coulter assembly with a variety of adjustment means. The coulter assembly itself contains no biasing spring. The Hardin et al. patent does not disclose the optimal spatial relationship between the offset fluted coulter wheels, but merely indicates that such offset will prevent clogging of the assembly. The Hardin et al. patent further contemplates that a conventional seed planting mechanism will be attached to and pulled behind the entire soil conditioning and seedbed preparation apparatus.

U.S. Pat. No. 4,987,481 describes a preferably uses paired, mirror-image fluted coulter assemblies for each seedbed, having adjustably attached fertilizer delivery tube assemblies which may contain optional knife-blades for additional soil cultivation.

Attachment of the two assemblies to an existing seed planting apparatus is accomplished by unequal length mounting brackets, thus ensuring that the coulter wheels will be longitudinally offset from each other for maximum efficiency. The mounting brackets allow coulter assembly attachment to the front, back, or underside of the front bar of an existing seed planting apparatus to provide a wide variety of placement options for the operator.

The assembly is spring biased towards the ground, and includes a spring housing assembly which may further function to receive the mounting brackets as an attachment point. The assembly may, by variously positioning the spring housing assembly within the adjustable mounting brackets, be adjusted for depth of cultivation. Lateral offset of the paired assemblies may be accomplished by variously and selectively locating the mounting brackets on the seed planting apparatus.

Fertilizer delivery tubes are attached to the apparatus behind the coulter wheels by means of a double-bend linkage arm attached to adjustable brackets. The double-bend linkage arm prevents soil and residue from clogging up in the fertilizer delivery tube area and thereby affecting the operation of the apparatus.

SUMMARY OF THE INVENTION

A device to deliver slurry into soil is attached behind a moving vehicle, the device comprising:
 a) a hinged connector that allows side-to-side movement (essentially horizontal movement) between the vehicle and b);
 b) a main frame;
 c) at least one coulter attached to the main frame;
 d) a retaining wheel and slurry applicator attached to the main frame; and
 e) a closure wheel attached to the main frame.

The at least one coulter preferably comprises a double coulter system and the closure wheel preferably has radially extending fingers. The slurry applicator is positioned to deliver slurry behind or in front of the axis of the retaining wheel. The closure wheel is preferably pivotally attached to the main frame and preferably the coulter is provided with a shock absorbing system between the coulter and the main frame. The retaining wheel is also preferably pivotally attached to the main frame and has tines radially extending from the wheel.

BRIEF DESCRIPTION OF THE FIGURES

FIG. 3A shows a side view of a coulter mounting stem.

FIG. 3B shows a rear explosion view of the coulter system of the invention.

DETAILED DESCRIPTION OF THE INVENTION

Figure 1:
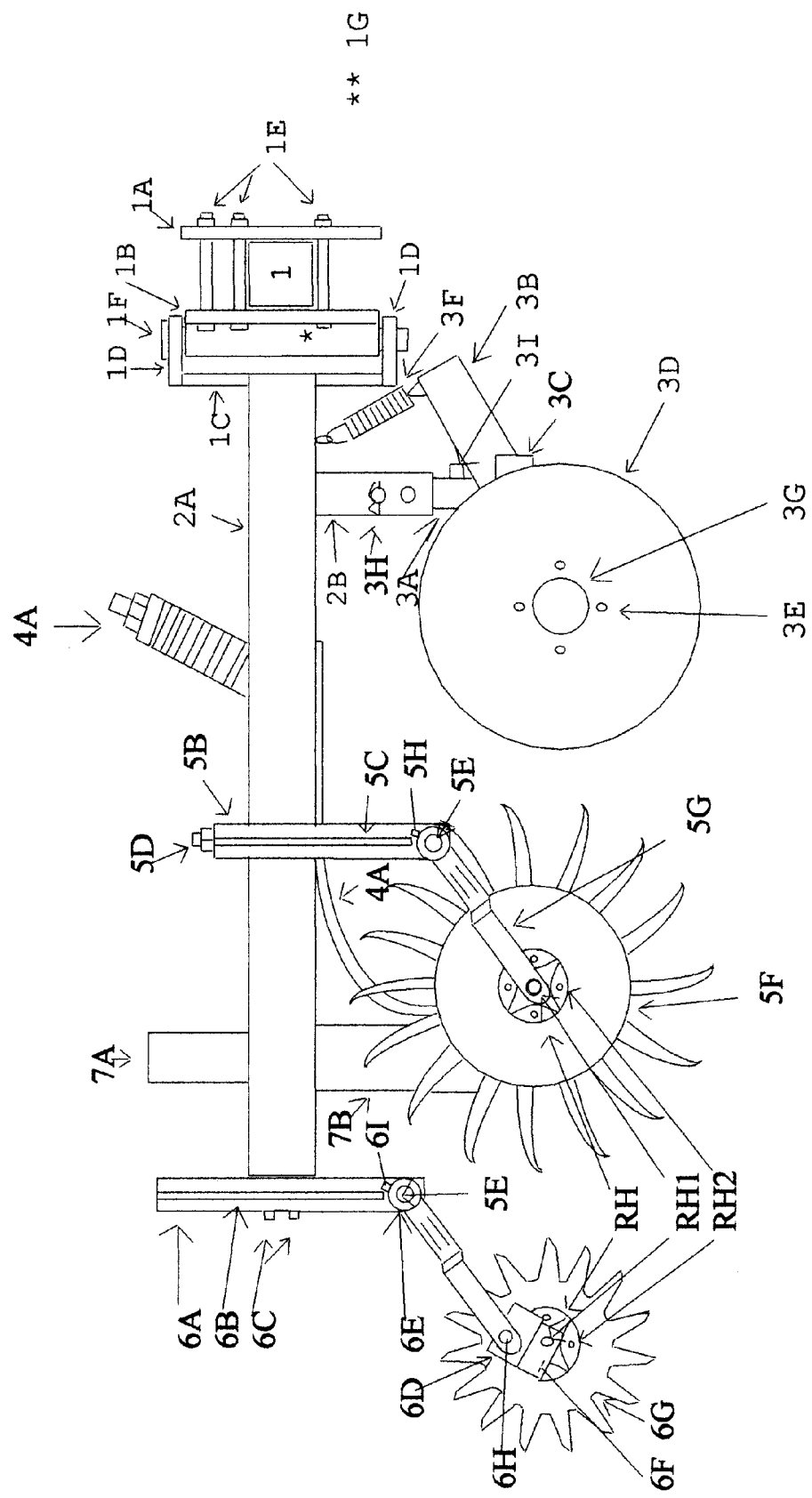
FIG. 1 shows a side view of a coulter system with applicator according to the teachings of the invention.

The invention provides an apparatus for injecting slurry into soils that will leave a smooth surface with a very high residue count in the soil. It is not designed primarily to apply chemicals such as anhydrous ammonia. However, one advantageously could use this apparatus for applying dry fertilizer such as lime and dry nitrogen fertilizer that would be blown (carried by air flow) from the truck down to the injection tube.

Important aspects of the invention include the retaining wheel assemblies 5F and closure wheel assemblies 6G. If either one of these items is removed from the injector, it will not meet the standards set by the NRCS (Natural Resource Conservation Service) for HEL soils. The retaining wheels are very important because they hold the soil and residue lifted and thrown by the shank in a very small area so that the closure wheels can bring this soil and residue back across the furrow made by the opening shank. The closure wheels also run outside of the retaining wheels, such as about 0.5 to 10 inches or 0.5 to 4 inches outside of the retaining wheels so that they can bring some of the undisturbed residue back across the furrow allowing for a higher residue count. The closure wheels make a small mound of soil over the furrow, which then settles back down in to the furrow as the manure is absorbed into the soils.

The present structure is clearly different from that described in U.S. Pat. No. 5,520,125 where the applicator is mounted in a fixed or stationary manner to the tool bar. This form of attachment causes the applicator element to be forced around as the operator turns the tractor or drive mechanism in the field. This forced turning will result in a drastic amount of wear or damage to both the wagon and the applicator. The invention of U.S. Pat. No. 5,520,125 is designed to apply chemicals to the soil as one cultivates their row crops. That unit uses a coulter to open a furrow for a knife to follow, the knife forming an opening to place the chemical. Following the chemical tube is a large sweep, which operates just below the soil to mix a large amount of the soil and cut the roots of unwanted plants between the crop rows. A shield is placed on both sides of the large sweep to keep the sweep from throwing soil on to the crop row resulting in crop coverage, which in turn kills the plant resulting in a lower yield. A press wheel is run directly behind the sweep. This wheel does not bring soil back over the furrow opened by the knife. This wheel simply firms the soil above the furrow reducing the amount of chemical lost back to the atmosphere. This unit is not designed for liquid manure and the unit of the present invention is not designed for anhydrous ammonia, which U.S. Pat. No. 5,520,125 indicates is a field of practice for that invention.

One embodiment of the slurry injector of the present invention is comprised of a hinge point allowing the operator to turn the primary vehicle while the injector is in operation. This reduces wear on the injector and on the wagon (vehicle) that the injector is mounted. The slurry injector preferably has a double coulter system that cuts the residue into short pieces, allowing the residue to pass freely between the shank and the retaining wheels. The coulters do not open a furrow for the shank to follow. The slurry injector has a narrow shank, e.g., between 1 and 20 cm, to minimize the soil disturbance. On both sides of the shank, rotating retaining wheels follow the soil surface on their own weight (and alternatively also with the weight of the structure attached to the retaining wheels) to retain the soil and residue lifted and thrown by the shank. These retaining wheels have a solid center with fingers extending from the center. The fingers are advantageous and assist in keeping the wheels turning as they follow the soil surface, reducing the chance of plugging. These fingers also break up the clods lifted by the shank, resulting in a smooth soil surface after application. These wheels run far enough away from the shank so that soil and residue can pass freely, yet the wheels run close enough to the shank so that he soil and residue is held close to the shank. The retaining wheels hold the residue and soil so that the closure wheels that are operating on their own weight, can bring the soil back over the furrow opened by the shank, resulting in minimal soil disturbance and a very smooth soil surface. The retaining and closure wheels operate on their own weight to reduce the amount of wear to these parts and to reduce the amount of soil disturbed. By allowing these wheels to operate on their own weight, they do not cut groves into the soil as they pass, reducing the chance of soil erosion. The slurry injector preferably uses closure wheels instead of press wheels to bring the soil back across the furrow opened by the shank. When press wheels are used, the pressure from these wheels force the slurry up out of the furrow and proper placement is reduced or eliminated. The slurry injector of the present invention is not designed specifically for chemical placement between crop rows or weed removal between crop rows.

U.S. Pat. No. 5,865,131 has an applicator mounted in a stationary manner to the tool bar. This causes the applicator to be forced around as the operator turns in the field resulting in a drastic amount of wear or damage to the wagon, the connecting system and the applicator. The structure of this patent also uses a single coulter to open a furrow in which the knife is to follow. Directly behind the coulter is a knife with wide wings. These wide wings lift a lot of soil causing a large amount of soil disturbance resulting in a rough surface and very low residue coverage. Tires run directly above the wings of the knife to help keep some of the soil from being lifted. These wheels run very close to the shank resulting in a small amount of clearance for soil and residue to pass freely resulting in a lot of plugging of the implement. Behind the knife, the invention contains closure wheels. These closure wheels have down pressure causing the wheels to dig furrows as they bring soil across the furrow formed by the knife. The furrows formed by the closure wheels are left open to the elements and create an ideal location for soil erosion to occur. Because these wheels are smooth edged, they do not bring the residue back across the furrow. Instead they only bring across the furrow the soil that they pull up due to the down pressure exerted on them.

U.S. Pat. No. 5,370,068 describes an applicator for liquid fertilizer placement ahead of a seed planter. This patent is not intended for slurry placement or for dry fertilizer placement. This is in direct contrast to the general function and purpose, and is not designed to prepare a seed bed or apply this type of liquid fertilizer. The invention of U.S. Pat. No. 5,370,068 uses a coulter to open a furrow in which the chemical is placed. This unit is designed to prepare a seedbed and at the same time put on liquid fertilizer. This invention is designed to be mounted ahead of a seed-planting unit. In contrast, the slurry injector of the present invention is comprised of a hinge point that allows the operator vehicle to turn while the injector is in operation, reducing wear on the injector and on the wagon that the injector is mounted.

U.S. Pat. No. 6,138,590 is designed for post plant applications, meaning that the liquid chemicals are applied between the crop rows. That invention uses a coulter to open the furrow for the sensors and for the fertilizer placement. Again this is not the type of fertilizer that a manure injector according to the present invention is designed to apply. Additionally, U.S. Pat. No. 6,138,590 is not designed to apply slurry to the soil. The fertilizer tube is much too small to incorporate slurry.

Referring to FIG. 1, reference numeral 1 generally designates a toolbar or tubular mounting frame mounted to the rear end of a wagon carrying a tank of slurry. Hosing pumps and other apparatus for delivering the slurry to the applicator is not shown because it is conventional.

A single unit is shown in the drawing. A person skilled in the art will readily realize that a number of such units can be located in spaced relation, side by side, along the tool bar 1, and at any lateral spacing desired by the farmer or operator.

A unit includes plates 1A and 1B (which can be seen in FIG. 1, a side view of the applicator), which are bolted to the tool bar 1, by bolts 1E mounting the entire applicator system to tool bar 1. Hinge bushing 1G is welded to plate 1B. Plates 1D are welded perpendicular to plate 1C to form a hinge. Pin 1F attaches plates 1D and 1C to bushing 1G, forming a hinge. This hinge allows the entire row unit to pivot horizontally on pin 1F as the operator of the slurry wagon turns while in operation. By allowing the row unit to pivot (trailing the wagon), instead of being forced to follow the wagon, stress is dramatically reduced on the row unit components, resulting in a much longer life for the row units and the slurry wagon. This hinge could also be built using a bearing and flange system, but the row unit might move too freely, so additional movement restrictions might have to be provided.

Figure 2:
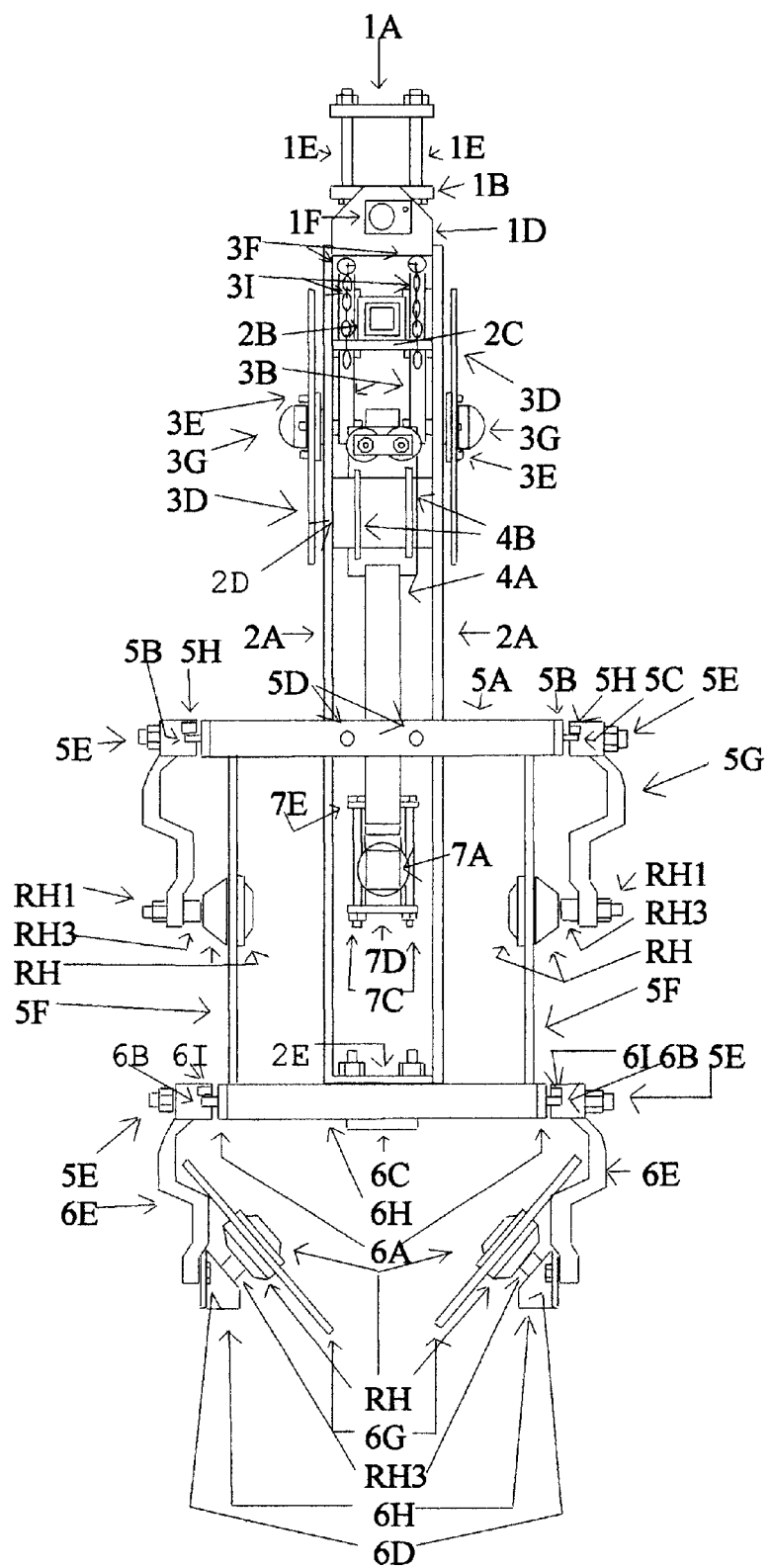
FIG. 2 shows a vertical view of a coulter system with applicator according to the teachings of the invention.

The main frame that can best be seen in FIG. 2, (Which is a top view of the applicator) consists of frame rails 2A which are welded perpendicular to each side of plate 1C. Plates 2C, 2E, and tubing 2D are welded to frame rails 2A. Tubing 2B is welded to plate 2C.

The coulter system, which can best be seen in FIG. 3 (View of the coulter assembly), consists of mounting tube 3A. Adjustment holes 3K are drilled in tubing 3A (The adjustment will be described later). Plates 3J are welded on two sides opposite of each other to tubing 3A. Plates 3J and 3C are guide plates for coulter arm 3B. Key stock 3I is welded perpendicular to tubing 3A, this is used as a stop for coulter pivot arm 3B. Spindle 3P is welded to arm 3B. Conventional Hub and bearing assembly 3G is fastened to spindle 3p. Coulter blade 3D is bolted to hub and bearing assembly 3G by bolts 3E. There are two coulter blades used in this system. The purpose for this is to cut the residue in to short pieces allowing the residue to pass freely between the retaining wheels 5F and shank 4A. The purpose of the coulters is not to open a furrow for the manure to be placed or to make an opening for the shank to follow. For certain conditions, a single coulter system is used such as injecting in sod and alfalfa. Spring loop 3M is welded to arm 3B, which is where conventional extension spring 3F hooks to coulter pivot arm 3B. Bushing 3N is inserted to each arm 3B. Coulter arms 3B are then bolted between plates 3C and 3J using bolt 3L through holes 3K. Coulter arms 3B pivot in a vertical plane on bushing 3N and bolt 3L. Conventional extension springs 3F hook to loops 3M and to adjustment chain 31. As seen best in FIG. 1, extension spring 3F holds the coulter arm 3B firm against the stop welded to the coulter mount tubing 3A. This extension spring also applies a downward force on the coulter, pulling it downward in the use position and allowing it to flow over obstacles which in turn reduces wear on the coulter system. Adjustment Chain 31 is used to adjust the amount of tension that the extension spring applies to the coulter as it is hooked to plate 2C. As seen in FIG. 1, the coulter system is adjustable in a vertical movement inside of tubing 2B by changing the location of hanging pin 3H.

Figure 5:
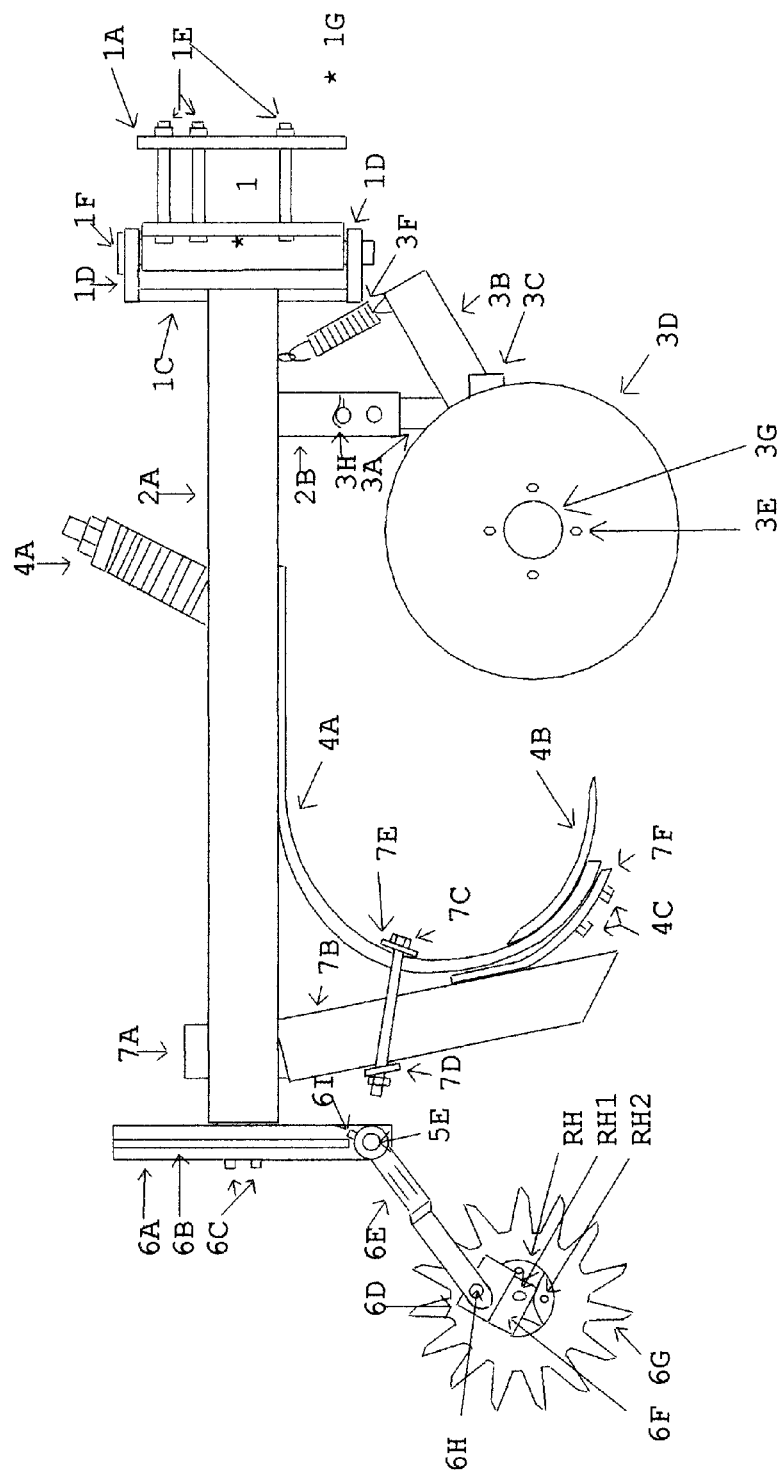
FIG. 5 shows a side view of a coulter system with applicator according to the teachings of the invention with a slurry placement tube mounted directly behind and to a shank assembly.

As best seen in FIG. 2, shank assembly 4A is bolted to tubing 2D by u-bolts 4B. Shank assembly 4A opens a 2 inch furrow in which the slurry is placed. As seen in FIG. 5, the slurry placement tube 7B is mounted directly behind and to shank assembly 4A. The slurry placement tube consists of tubing 7B which has strap 7F welded to the front. Strap 7D is welded to the back of tubing 7B. Pipe 7A is smashed at the bottom and welded to tubing 7B. Pipe 7A is the u adapter from a conventional 3 inch hose to placement tubing 7A. Chisel point 4B and strap 7F are bolted to shank assembly 4A using bolts 4C. Plates 7D and 7E are bolted around tubing 7B and shank 4A, this stabilizes the placement tubing to shank 4A.

Figure 4:
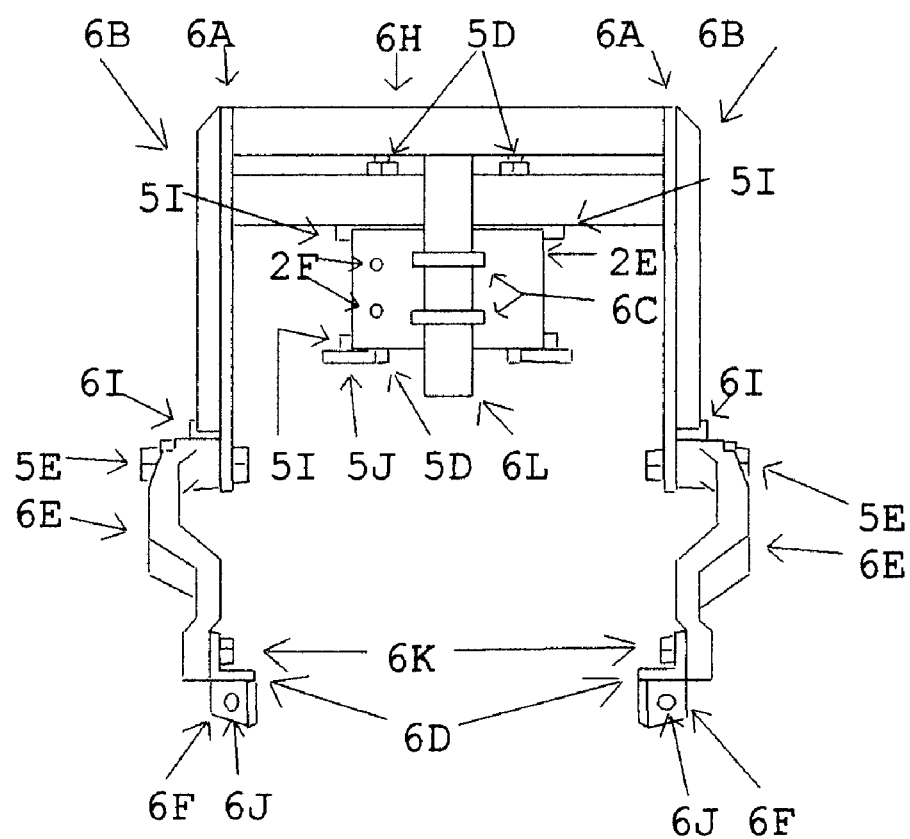
FIG. 4 shows a frontal view of the support structure for a closure wheel.

As best seen in FIG. 2, tubing 5A is bolted to main frame 2A using bolts 5D. As best seen in FIG. 4, angle iron 5J is welded to bolts 5D. Key stock 5I is welded to angle iron 5J. Bolts 5D, angle iron 5J and key stock 5I form a clamp, which clamps the retaining wheel system so to main frame rails 2A. These clamps also allow the retaining wheel system to be adjusted forward or backwards on the main frame. Referring back to FIG. 2, mounting arms 5B are welded to tubing 5A in a downward position. Support braces and stop arms 5C are welded perpendicular to the center of mounting arms 5B. Key stock 5H is welded to pivot arm 5G. This is used as a stop for pivot arm 5G as key stock 5H rests against support braces and stop arm 5C when pivot arm 5G is in the rest position. Pivot arm 5G bolts to mounting arm 5B by bolt 5E. Pivot arm 5G pivots in a vertical plane allowing retaining wheel 5F to follow the surface of the soil. Pivot arm 5G also runs only on its' and the retaining wheel's own weight with no other down pressure applied. As seen in FIG. 1, retaining wheel 5G is bolted to hub and bearing assembly RH using bolts RH2. Going back to FIG. 2, retaining wheel 5F and the hub and bearing assembly RH, are bolted to pivot arm 5G with spacer RH3 inserted between the hub RH and pivot arm 5G. The purpose of this system is to retain the soil and residue close to the shank so that it can be brought back over the furrow formed by shank 4A, keeping a smooth surface and a high residue count after application. Retaining wheel 5F has tines extending from the solid center portion of the wheel, which helps the wheel keep turning as it travels across the soil. The turning of retaining wheel 5F helps the soil and residue pass around the shank and the turning tines also break up clods, which are brought up by the shank.

Several different items could be used for retaining wheels: a solid disk blade could be used which may slide and eventually plug as it travels across the soil surface, a tire could be used, but this will not help chew up the soil clods, and one could even go as far as using a stationary shield to retain the soil and residue.

As best seen in FIG. 4, adjustment tubing 6L is welded perpendicular to the bottom of tubing 6H. Mounting arm 6A is welded to tubing 6H. Support braces and stop arm 6B is welded perpendicular and in the center of mounting arm 6H. As best seen in FIG. 1, key stock 6I is welded to pivot arm 6E. This is used as a stop for pivot arm 6E as key stock 6I rests against support braces and stop arm 6B when pivot arm 6E is in the rest position. Pivot arm 6E bolts to mounting arm 6B by bolt 5E. Pivot arm 6E pivots in a vertical plane allowing closure wheel 6G to follow the surface of the soil. Pivot arm 6E runs only on its' and the closure wheel's own weight with no other down pressure applied. Going back to FIG. 4, hole 6J is drilled into plate 6F, this is where the closure wheel will bolt later on. Plate 6F is welded to the bottom of angle iron 6D. Angle iron 6D is both bolted and spot welded to pivot arm 6E. Tubing 6L is bolted to plate 2E by u-bolts 6C. Tubing 6L is also adjustable vertically by using u-bolts 6C. As best seen in FIG. 1, closure wheel 6G is bolted to hub and bearing assembly RH using bolts RH2. Closure wheel 6G and hub and bearing assembly RH are bolted to plate 6F by using bolts RH2. Closure wheels 6G bring the soil and residue held by the retaining wheels back across the furrow covering the slurry, reducing odor, volatilization, runoff, and yet leaving a smooth soil surface and a high residue count. As the closure wheels turn, the tines bring some of the undisturbed residue outside of the retaining wheel back across the furrow resulting in even a higher residue count. Many like to use a disc blade to close the furrow, but one does not get the smooth surface and high residue counts which is important on HEL (highly errodible land) soils as one does using the fingered closure wheels.

Figure 6:
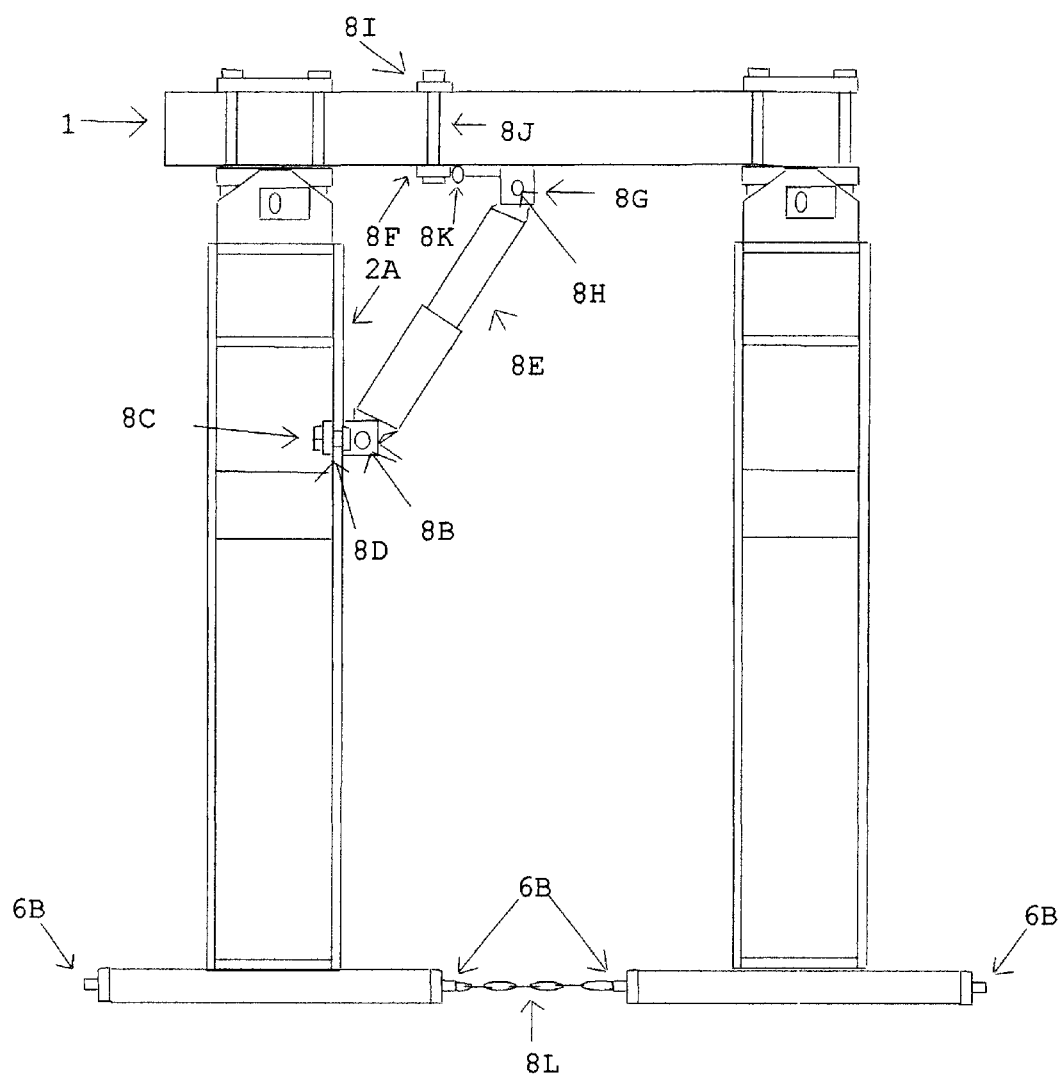
FIG. 6 shows a vertical view of a shock absorber that keeps the row units from swaying during travel.

FIG. 6 shows the shock absorber (this is a picture of the left side of the tool bar and this is mirrored for the right side of the tool bar.), which keeps the row units from swaying during travel. Brackets 8B and 8D are bolted to main frame rail by bolts 8D. Brackets 8I and 8F are bolted to tool bar 1 by bolts 8J. Hinge 8G is pinned to bracket 8F by pin 8K. The Shock absorber 8E is bolted to hinge 8G by bolt 8H and to bracket 8B by bolt 8M. The shock absorber 8E is mounted to the outside rows of the tool bar. All row units are chained together by chain 8L on arms 6B. The shock absorbers 8E exert an outward tension on the row units in an opposite direction. This opposite tension pulls the chains 8L tight, keeping the row units in a stable position for road travel yet the tension is light enough that the row units can pivot in the working position.

What is claimed:

1. A device for attachment to a vehicle to deliver slurry into soil, the device comprising:
   a) a hinged connector that allows side-to-side movement between the vehicle and a main frame;
   b) the main frame;
   c) at least one coulter attached to said main frame, the at least one coulter forming furrows in soil;
   d) a retaining wheel and slurry applicator attached to said main frame, the retaining wheel holding residue and soil in position for movement by a closure wheel; and
   e) the closure wheel attached to said main frame, the closure wheel bringing soil and residue over the furrows in the soil.

2. The device of claim 1 wherein the at least one coulter comprises a double coulter system.

3. The device of claim 1 wherein the closure wheel has radially extending fingers.

4. The device of claim 1 wherein the slurry applicator is positioned to deliver slurry behind or in front of the axis of the retaining wheel.

5. The device of claim 3 wherein the closure wheel is pivotally attached to the main frame.

6. The device of claim 1 wherein the at least one coulter is provided with a shock absorbing system between the coulter and the main frame.

7. The device of claim 2 wherein the at least one coulter is provided with a shock absorbing system between the coulter and the main frame.

8. The device of claim 1 wherein the retaining wheel is pivotally attached to the main frame.

9. The device of claim 8 wherein the retaining wheel has tines radially extending from the wheel.

10. The device of claim 1 wherein the slurry applicator is positioned to deliver slurry behind the axis of the retaining wheel.

11. The device of claim 1 wherein the slurry applicator is positioned to deliver slurry in front of the axis of the retaining wheel.

* * * * *